United States Patent
Kobayashi (10) Patent No.: US 10,883,591 B2
(45) Date of Patent: Jan. 5, 2021

(54) SLIDING CONTACT-TYPE WAVE GENERATOR, STRAIN WAVE GEARING, AND WAVE-GENERATING METHOD

(71) Applicant: HARMONIC DRIVE SYSTEMS INC., Tokyo (JP)

(72) Inventor: Masaru Kobayashi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 448 days.

(21) Appl. No.: 15/760,671

(22) PCT Filed: Sep. 29, 2015

(86) PCT No.: PCT/JP2015/077528
§ 371 (c)(1),
(2) Date: Mar. 16, 2018

(87) PCT Pub. No.: WO2017/056192
PCT Pub. Date: Apr. 6, 2017

(65) Prior Publication Data
US 2019/0085962 A1  Mar. 21, 2019

(51) Int. Cl.
| | | |
|---|---|---|
| F16H 1/32 | (2006.01) | |
| F16H 49/00 | (2006.01) | |
| F16C 33/26 | (2006.01) | |
| F16C 17/18 | (2006.01) | |
| F16C 17/04 | (2006.01) | |

(Continued)

(52) U.S. Cl.
CPC .......... *F16H 49/001* (2013.01); *F16C 17/04* (2013.01); *F16C 17/18* (2013.01); *F16C 33/26* (2013.01);
(Continued)

(58) Field of Classification Search
CPC ........ F16H 49/001; F16C 19/50; F16C 33/26; F16C 33/581
(Continued)

(56) References Cited

U.S. PATENT DOCUMENTS 1,563,663 A * 12/1925 Seabury .................. F16C 33/24
384/297
1,716,499 A *  6/1929 Morris .................... F16C 33/26
384/125
(Continued)

FOREIGN PATENT DOCUMENTS

GB           139139    *  2/1920
JP        61-262260 A    11/1986
(Continued)

OTHER PUBLICATIONS

International Search Report (PCT/ISA/210) dated Dec. 15, 2015, by the Japanese Patent Office as the International Searching Authority for International Application No. PCT/JP2015/077528.
(Continued)

*Primary Examiner* — William C Joyce
(74) *Attorney, Agent, or Firm* — Buchanan Ingersoll & Rooney PC (57) ABSTRACT

The wave generator of a strain wave gearing is provided with an ellipsoidally contoured wave generator plug and a wave generator bearing. The wave generator bearing is provided with an annular body fitted between inner and outer races in a sliding contact state. The annular body is composed of an endless coil spring and has a rigidity that is able to maintain a constant gap between the inner and outer races. The annular body also has a specified overall flexibility in the radial direction so that the annular body can be flexed into an ellipsoidal shape by the wave generator plug. Since sliding occurs between the annular body and the inner race when the wave generator plug rotates, it is possible to generate a wave motion in an externally toothed gear with a small rotational torque.

8 Claims, 6 Drawing Sheets

(51) Int. Cl.
*F16C 19/55* (2006.01)
*F16C 19/24* (2006.01)
*F16C 33/58* (2006.01)
*F16C 19/50* (2006.01)

(52) U.S. Cl.
CPC .............. *F16C 19/24* (2013.01); *F16C 19/50* (2013.01); *F16C 19/55* (2013.01); *F16C 33/581* (2013.01)

(58) Field of Classification Search
USPC .......................................................... 74/640
See application file for complete search history.

(56) References Cited

U.S. PATENT DOCUMENTS 3,167,366 A * 1/1965 Freund .................... F16C 33/26
384/283
6,168,314 B1 * 1/2001 Imai ........................ F16C 23/02
384/215
2007/0157760 A1 7/2007 Kiyosawa et al.

FOREIGN PATENT DOCUMENTS

| | | |
|---|---|---|
| JP | 2006-097861 A | 4/2006 |
| JP | 2008-180259 A | 8/2008 |
| JP | 4588023 B2 | 11/2010 |
| JP | 2011-172455 A | 9/2011 |
| JP | 2012-241865 A | 12/2012 |

OTHER PUBLICATIONS

Written Opinion (PCT/ISA/237) dated Dec. 15, 2015, by the Japanese Patent Office as the International Searching Authority for International Application No. PCT/JP2015/077528.

* cited by examiner

SLIDING CONTACT-TYPE WAVE GENERATOR, STRAIN WAVE GEARING, AND WAVE-GENERATING METHOD

TECHNICAL FIELD

The present invention relates to a strain wave gearing, and particularly relates to a wave generator of a strain wave gearing and a wave-generating method, in which an externally toothed gear capable of flexing in a radial direction is made to flex into a non-circle such as an ellipsoid and partially mesh with a rigid internally toothed gear, and as the wave generator rotates, the meshing positions between the externally toothed gear and the internally toothed gear move in a circumferential direction.

BACKGROUND ART

Most wave generators of strain wave gearings typically have balls, rollers, or other rolling elements that are caused to roll in the external peripheral side of an ellipsoidal plug, and wave motion is generated in an externally toothed gear (a rolling contact-type wave generator). A rolling contact-type wave generator is provided with a roller bearing fitted between the ellipsoidal external peripheral surface of the rigid plug and the internal peripheral surface of the flexible externally toothed gear. The wave generator rotates while in rolling contact with the internal peripheral surface of the externally toothed gear, and portions of the externally toothed gear along the circumferential direction are made to vibrate in the radial direction at a constant amplitude. These wave generators are used in, e.g., the flat strain wave gearing disclosed in Patent Document 1, and the cup-shaped or top-hat-shaped strain wave gearing disclosed in Patent Document 2.

PRIOR ART LITERATURE

Patent Documents

Patent Document 1: JP 2008-180259 A
Patent Document 2: JP 2006-97861 A

SUMMARY OF THE INVENTION

Problems to be Solved by the Invention

Here, a type of wave generator could be used in which an ellipsoidal plug in direct contact with the inner peripheral surface of the externally toothed gear is made to slide along the inner peripheral surface, causing the externally toothed gear to generate waves (referred to hereinafter as a "sliding contact-type wave generator"). Compared with a rolling contact-type wave generator, the sliding contact-type wave generator has less viscous resistance due to rotation and virtually no change in input torque even when input speed increases, and therefore has better efficiency during high-speed rotation. However, sliding contact-type wave generators are problematic in regard to the high rotational torque for generating waves.

In a cup-shaped or top-hat-shaped strain wave gearing, a state of three-dimensional flexure, referred to as coning, occurs in the cup-shaped or top-hat-shaped externally toothed gear. When a sliding contact-type wave generator is used in such a strain wave gearing, the ellipsoidal external peripheral surface of the plug of the wave generator will be in a state of one-sided contact with the internal peripheral surface of the externally toothed gear. This causes the rotational torque of the wave generator to increase.

Figure 6:
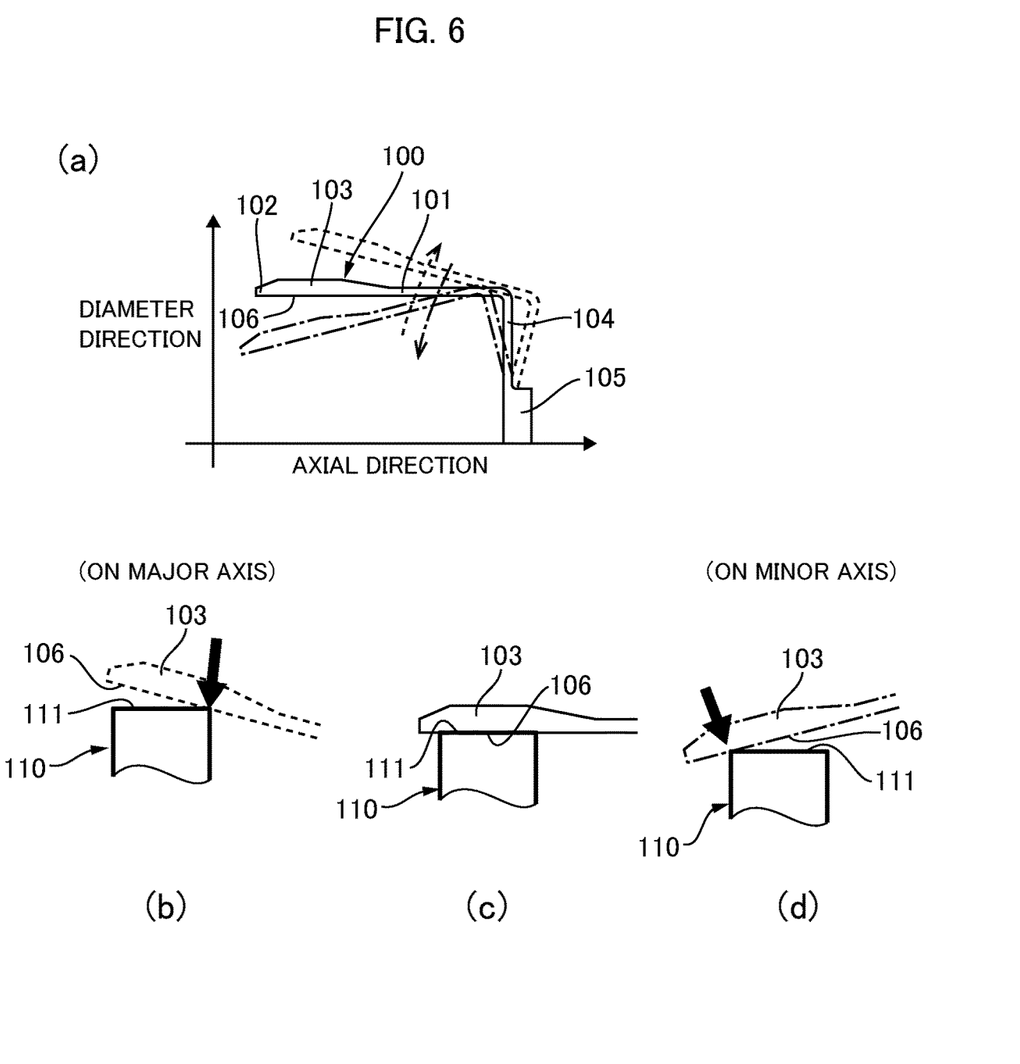
FIGS. 6(a), 6(b), 6(c) and 6(d) includes descriptive diagrams showing coning of an externally toothed gear in a cup-shaped strain wave gearing.

The coning of the cup-shaped externally toothed gear is described with reference to FIG. 6. The externally toothed gear 100 is provided with a cylindrical barrel part 101 capable of flexing in the radial direction, external teeth 103 formed in the external peripheral surface on the side near an open end 102, a diaphragm 104 extending inward from the other end of the cylindrical barrel part 101, and a discoidal or annular boss 105 joined to the inner peripheral edge of the diaphragm 104, as shown in FIG. 6(a). The external-teeth-formed portion of the cylindrical barrel part 101 is made to flex into an ellipsoidal contour by a wave generator 110, and the amount of flexure in the radial direction therefore gradually increases from the diaphragm 104 side toward the open end 102 of the cylindrical barrel part 101, in accordance with the distance from the diaphragm 104 side.

In a major axis cross-section of the ellipsoidal shape in the external-teeth-formed portion, this portion flexes so as to open outward as shown in FIG. 6(b), and in a minor axis cross-section, flexes so as to narrow inward as shown in FIG. 6(d). As the wave generator 110 rotates, the external-teeth-formed portion of the externally toothed gear 100 is repeatedly made to flex in the radial direction as described above. This flexed state is referred to as coning of the externally toothed gear 100.

Due to the coning of the externally toothed gear 100, the internal peripheral surface 106 of the external-teeth-formed portion assumes a state such that the end on the diaphragm side is in one-sided contact with the plug external peripheral surface 111 at the major axis positions of the ellipsoidal shape, the end on the open end 102 side is in one-sided contact at the minor axis positions, and only in the middle between these two ends does the internal peripheral surface 106 comes into contact uniformly with the plug external peripheral surface 111, as shown in FIG. 6(c). Such one-sided contact causes the rotational torque of the wave generator 110 to increase.

In view of such matters, it is an object of the present invention to provide a sliding contact-type wave generator designed such that waves can be generated in the externally toothed gear with low rotational torque, a strain wave gearing provided with this wave generator, and a wave-generating method.

Another object of the present invention is to provide: a sliding contact-type wave generator designed so that the one-sided contact state of the plug external peripheral surface on a cup-shaped or top-hat-shaped externally toothed gear is eliminated, and waves can be generated in the externally toothed gear with small rotational torque; a strain wave gearing provided with this wave generator; and a wave-generating method.

Means of Solving the Problems

To solve the problems described above, according to the present invention, there is provided a wave generator of a strain wave gearing, in which an externally toothed gear capable of flexing in a radial direction is made to flex into a non-circular shape, e.g., an ellipsoidal shape and partially mesh with a rigid internally toothed gear, and positions where the externally toothed gear and the internally toothed gear are made to move in a circumferential direction by rotation of the wave generator, the wave generator characterized by comprising:

a rigid wave generator plug provided with a non-circular, e.g., ellipsoidal external peripheral surface; and a wave generator bearing fitted to the external peripheral surface and made to flex into a non-circular, e.g., ellipsoidal shape;

wherein the wave generator bearing is provided with an inner race, an outer race, and an annular body fitted between the inner race and the outer race in a state of sliding contact; and the annular body is composed of an endless coil spring, and provided with rigidity capable of maintaining a fixed gap between the inner race and outer race, and flexibility in a radial direction of the annular body so as to be capable of flexing into a non-circular shape, e.g., an ellipsoidal shape following the inner race.

Because the annular body of the wave generator bearing is provided with rigidity capable of maintaining a fixed gap between the inner race and outer race, the outer race is also made to flex into an ellipsoidal shape corresponding to the ellipsoidal external peripheral surface of the wave generator plug. The wave generator plug is rotatably driven by an electric motor or the like. An inner-ring-side sliding contact surface between the annular body and the inner race is positioned farther inward in the radial direction than an outer-ring-side sliding contact surface between the annular body and the outer race, and the frictional resistance occurring in the inner-ring-side sliding contact surface is therefore less than the frictional resistance occurring in the outer-ring-side sliding contact surface. Consequently, when the wave generator plug rotates, sliding occurs between the annular body and the inner race in the inner-ring-side sliding contact surface. Therefore, the wave generator can be made to rotate with less rotational torque than when the wave generator plug comes into contact with a position farther outward in the radial direction than the outer-ring-side sliding contact surface, i.e., directly into sliding contact with the internal peripheral surface of the externally toothed gear.

In the externally toothed gear, which is made to flex into a non-circular shape by the wave generator and meshed with the internally toothed gear, the positions where meshing occurs with the internally toothed gear move in the circumferential direction due to the rotation of the wave generator plug. Relative rotation, which corresponds to the difference in the number of teeth between the two gears, thereby occurs between the two gears. For example, high-speed rotation inputted to the wave generator plug is greatly reduced and extracted from one gear.

In the present invention, the external peripheral surface of the inner race is provided with an inner race track surface having a recessed arcuate cross-section with which an external peripheral surface portion of the annular body comes into sliding contact, and the internal peripheral surface of the outer race is provided with an outer race track surface having a recessed arcuate cross-section with which an internal peripheral surface portion of the annular body comes into sliding contact. Rotational torque can be reduced by reducing sliding resistance between the annular body and the inner race track surface, and between the annular body and the outer race track surface.

In the present invention, with a greater coil winding diameter in the endless coil spring constituting the annular body, the distance from the rotational center of the wave generator to the sliding contact surfaces between the annular body and the inner race can be further shortened, and the required rotational torque can also be further reduced. For example, it is possible to use an annular body composed of an endless coil spring having a coil winding diameter greater than the width of the inner and outer races.

In the present invention, the wave generator bearing may be provided with a plurality of annular bodies fitted between the inner race and the outer race.

It is also possible for the inner race of the wave generator bearing to be integrally formed in the non-circular external peripheral surface of the wave generator plug. Similarly, it is also possible for the outer race of the wave generator bearing to be integrally formed in the internal peripheral surface of the externally toothed gear.

The wave generator of the strain wave gearing of the present invention in this case is characterized by comprising:

a rigid wave generator plug provided with a non-circular external peripheral surface; and an annular body fitted to the non-circular external peripheral surface so as to be capable of sliding contact;

wherein the annular body being composed of an endless coil spring, and provided with predetermined rigidity capable of maintaining a fixed coil winding diameter, and predetermined flexibility in a radial direction of the annular body so as to be capable of flexing into a non-circular shape corresponding to the non-circular external peripheral surface.

In this case, a track surface, with which the annular body comes into sliding contact, is formed in the non-circular external peripheral surface. Additionally, the coil winding diameter of the annular body can be made greater than the width dimension of the non-circular external peripheral surface.

Next, the strain wave gearing of the present invention is characterized by comprising the wave generator having the configuration described above. With a sliding contact-type wave generator, wave motion can be generated in the externally toothed gear with low rotational torque.

Particularly, the present invention is suitable for use in a strain wave gearing having a cup-shaped or top-hat-shaped externally toothed gear. The outer race of the wave generator bearing is able to swing about the annular body, following the coning of the externally toothed gear. Consequently, one-sided contact of the outer race on the internal peripheral surface of the external-teeth-formed portion can be avoided or mitigated, and any increase in rotational torque caused by coning can be minimized.

The present invention relates also to a method for generating wave motion in a strain wave gearing, in which wave motion is generated in a flexible externally toothed gear made to flex into a non-circular shape, so as to cause portions in the externally toothed gear to repeatedly flex in a radial direction, in order to cause positions where meshing occurs with a rigid internally toothed gear to move in a circumferential direction, said method characterized in that:

a rigid wave generator plug provided with a non-circular external peripheral surface is fitted in the internal peripheral surface of the externally toothed gear with a wave generator bearing held therebetween, whereby forming a state in which the externally toothed gear is made to flex into a non-circle;

the wave generator bearing is configured from an inner race, an outer race, and an annular body composed of an endless coil spring fitted in a state of sliding contact between the inner race and the outer race; and the wave generator plug is caused to rotate to form a state of sliding contact between the inner race and the annular body and generate waves in the externally toothed gear.

When the inner race of the wave generator bearing is integrally formed in the non-circular external peripheral surface of the wave generator plug, the method for generating wave motion in a strain wave gearing of the present invention is characterized in that:

the rigid wave generator plug provided with the non-circular external peripheral surface is fitted in the internal peripheral surface of the externally toothed gear with the annular body composed of an endless coil spring held therebetween, forming a state in which the externally toothed gear is made to flex into a non-circle; and the wave generator plug is caused to rotate to form a state of sliding contact between the non-circular external peripheral surface and the annular body and generate the waves in the externally toothed gear.

MODE FOR CARRYING OUT THE INVENTION

Embodiments of a strain wave gearing provided with a sliding contact-type wave generator to which the present invention is applied are described below with reference to the drawings. The following embodiments relate to a cup-shaped strain wave gearing, but the present invention can also be applied to a top-hat-shaped strain wave gearing or a flat strain wave gearing.

Figure 1:
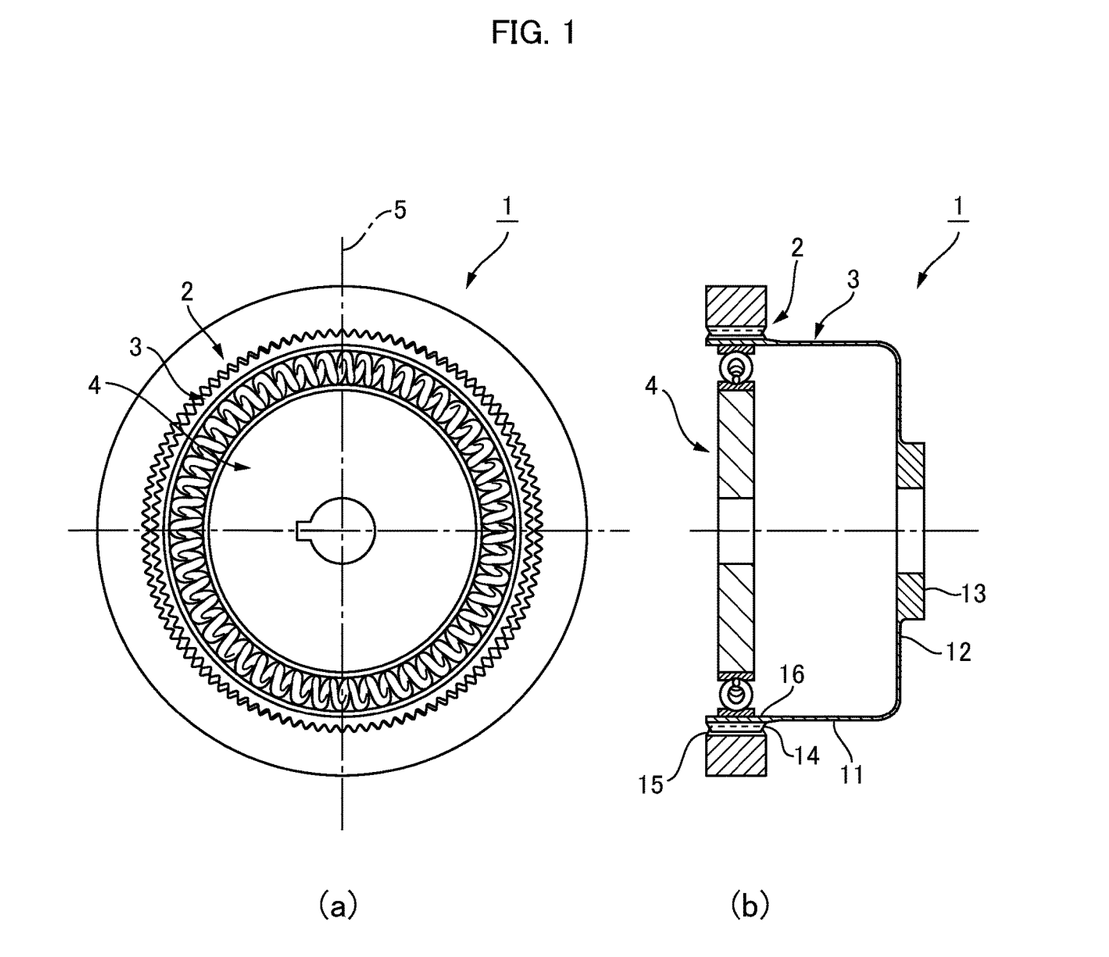
FIGS. 1(a) and 1(b) includes a schematic front view and a schematic longitudinal cross-sectional view showing a strain wave gearing to which the present invention is applied.

FIG. 1 includes a schematic front view and a schematic longitudinal cross-sectional view showing a cup-shaped strain wave gearing according to the present embodiment. The strain wave gearing 1 is provided with a rigid internally toothed gear 2, a flexible externally toothed gear 3 coaxially disposed on the inner side of the internally toothed gear, and an ellipsoidally contoured wave generator 4 fitted in the inner side of the externally toothed gear.

The externally toothed gear 3, which has a cup shape, is provided with a cylindrical barrel part 11 capable of flexing in the radial direction, a diaphragm 12 extending inward in the radial direction from the rear end of the cylindrical barrel part 11, an annular boss 13 continuous with the inner peripheral edge of the diaphragm 12, and external teeth 14 formed in the external peripheral surface portion on an open-end side of the cylindrical barrel part 11.

The wave generator 4 is fitted in the inner side of the external-teeth-formed portion where the external teeth 14 are formed in the externally toothed gear 3, and the external-teeth-formed portion is made to flex into an ellipsoidal shape. The external teeth 14 mesh with the internal teeth 15 of the internally toothed gear 2 along the major axis 5 of the ellipsoidally flexed external-teeth-formed portion. When the wave generator 4 is caused to rotate by an electric motor (not shown) or the like, the meshing positions of the gears 2, 3 move in the circumferential direction. In other words, parts of the external-teeth-formed portion of the externally toothed gear 3 vibrate in the radial direction in two cycles per rotation of the wave generator.

Thus, wave motion is generated in the externally toothed gear 3, and due to the meshing positions of the two gears moving in the circumferential direction, relative rotation corresponding to the difference in the number of teeth occurs between the two gears. When the strain wave gearing is used as a reducer, one gear, e.g., the internally toothed gear 2 is fixed so as to not rotate, and rotation greatly reduced relative to the rotation of the wave generator 4 is acquired from the externally toothed gear 3.

Figure 2:
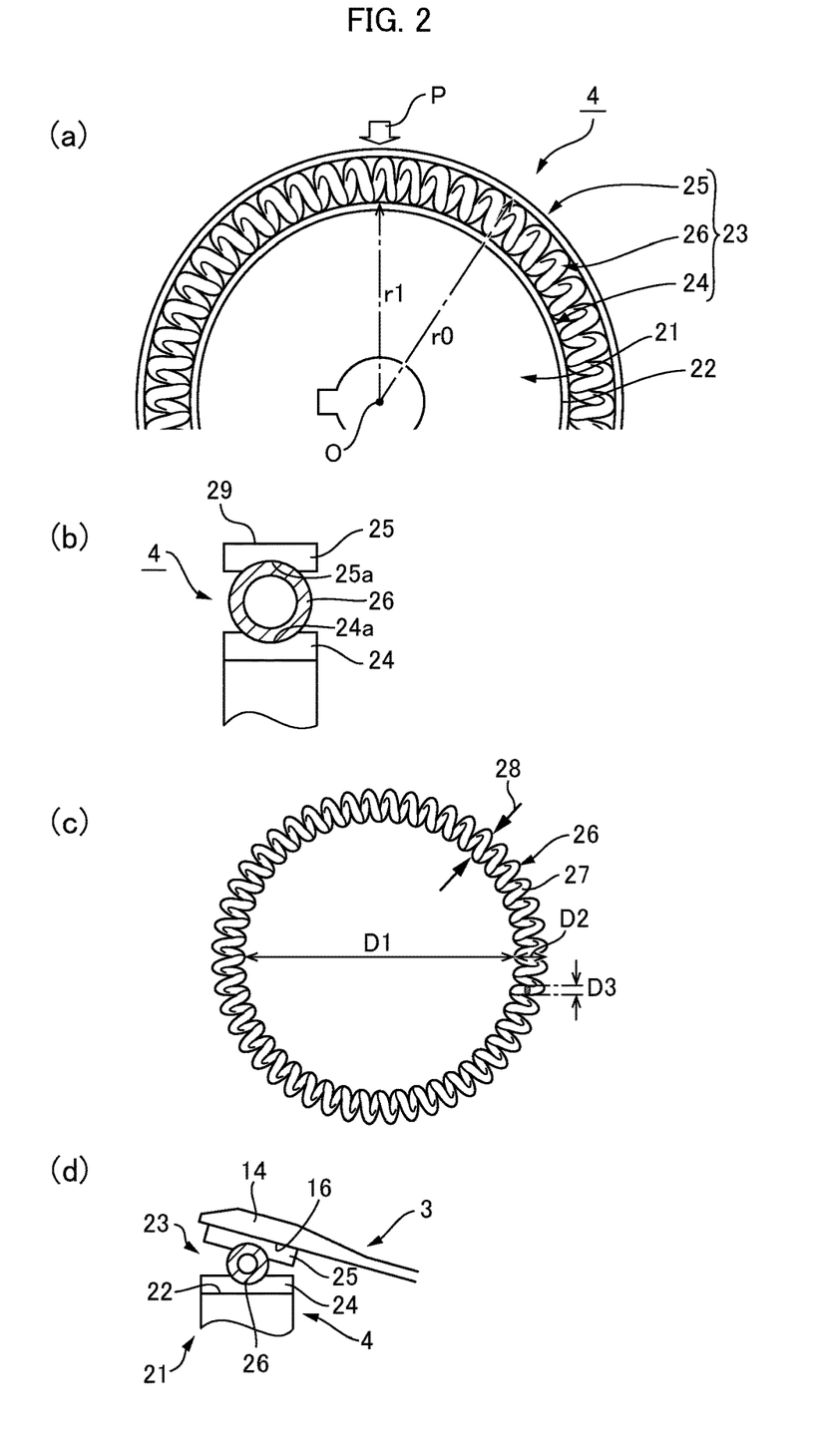
FIGS. 2(a), 2(b), 2(c) and 2(d) includes a partial front view showing the wave generator of FIG. 1, a partial cross-sectional view of the same, a front view showing an annular body, and a descriptive diagram showing the outer race movement that follows the coning of the externally toothed gear.

FIGS. 2(a) and (b) are a partial front view and a partial cross-sectional view showing the wave generator 4. The wave generator 4 is provided with a rigid wave generator plug 21, and a wave generator bearing 23 fixed to the ellipsoidal external peripheral surface 22 of the wave generator plug 21. The wave generator bearing 23 is initially in the shape of a perfect circle, but is overall made to flex into an ellipsoidal shape by the wave generator plug 21.

The wave generator bearing 23 is provided with an inner race 24 fixed by press-fitting to the external peripheral surface 22 of the wave generator plug 21, an outer race 25 in contact with the internal peripheral surface 16 (see FIG. 1) of the externally toothed gear 3, and an annular body 26 fitted in between the inner and outer races 24, 25. An inner race track surface 24a composed of an arcuate recess is formed in the external peripheral surface of the inner race 24, and an outer race track surface 25a composed of an arcuate recess is formed in the internal peripheral surface of the outer race 25. The annular body 26 is disposed in a state of sliding contact with both the inner race track surface 24a and the outer race track surface 25a.

The annular body 26 is composed of an endless coil spring, in which both ends of a coil spring 27 are joined together, as shown in FIG. 2(c). The annular body 26 functions substantially as a rigid body in a coil winding diameter direction, shown by the arrow 28 in this drawing. Overall, however, the annular body 26 functions as a flexible body having predetermined flexibility in the radial direction. Therefore, the gap between the inner race 24 and the outer race 25 on both sides of the annular body 26 is kept constant in multiple places along the circumferential direction. Additionally, the wave generator bearing 23 is overall made to flex into an ellipsoidal shape by the wave generator plug 21.

To give a further description, the mechanical properties of the annular body 26 are set by changing the material of the coil spring 27, and the inside diameter D1, coil winding diameter D2, wire diameter D3, and number of windings of the annular body 26. For example, the rigidity in the coil winding diameter direction (the direction of the arrow 28) can be increased by increasing the number of windings of the coil spring 27 (by increasing the winding density). The maximum value of this rigidity is attained when the inner-peripheral coil windings of the annular body 26 are firmly adhering to each other.

In terms of characteristics such as ease of assembly and transmission of an exact ellipsoidal shape to the externally toothed gear, the annular body 26 requires characteristics such as ease of deforming in the radial direction, ease of flexing due to uniform stress from the internal peripheral side or the external peripheral side, and sufficient rigidity in the coil winding diameter direction. Therefore, the annular body 26 is designed with these characteristics taken into account. For example, it is preferable to use a garter spring, a diagonally wound radial spring, etc., obtained by linking together both ends of a coil spring to form an annulus.

The wave generator 4 is assembled in the following manner. First, the annular body 26, composed of an endless coil spring, is fitted between the inner race 24 and the outer race 25, which are in a perfectly circular state, to assemble the wave generator bearing 23. Next, the ellipsoidal-contoured wave generator plug 21 is fitted and fixed to the inner side of the inner race 24 of the wave generator bearing 23. When the wave generator plug 21 is fitted, the wave generator bearing 23 is overall made to flex into an ellipsoidal shape, and the external peripheral surface 29 of the outer race 25 assumes an ellipsoidal shape corresponding to the ellipsoidal shape of the wave generator plug 21.

The externally toothed gear 3, to the inner side of which is fitted the wave generator 4 having the aforementioned configuration, flexes into an ellipsoidal shape and meshes with the internally toothed gear 2 at the positions of the major axis 5, as previously described. In the wave generator 4, the coil winding portions of the annular body 26, which is composed of an endless coil spring, come into contact with the inner race track surface 24a and outer race track surface 25a of the inner and outer races 24, 25 at numerous points along the circumferential direction. When the wave generator 4 is caused to rotate by an electric motor (not shown) or the like, sliding occurs between the annular body 26 and the inner race track surface 24a, and the wave generator 4 can be rotated by small rotational torque to generate waves in the externally toothed gear 3.

Referring to FIG. 2(a), the sliding contact surfaces in the wave generator bearing 23 are between the inner race track surface 24a and the internal-peripheral-side portion of the annular body 26, and between the outer race track surface 25a and the external-peripheral-side portion of the annular body 26. The distance from the rotational center O to the outer race track surface 25a is denoted as the radius r0, the distance from the rotational center O to the inner race track surface 24a is denoted as the radius r1, the frictional coefficient of the sliding contact surfaces is denoted as μ, and the radial load acting on the major axis positions is denoted as P. The rotational torque T0 (frictional resistance) on the outer race track surface-side and the rotational torque T1 (frictional resistance) on the inner race track surface-side are represented as follows.

$$T0 = 2 \cdot r0 \cdot \mu \cdot P$$

$$T1 = 2 \cdot r1 \cdot \mu \cdot P$$

Because the radius r1 is less than r0, as long as the sliding contact surfaces have the same frictional coefficient μ, sliding occurs between the annular body 26 and the inner race 24 in the inner race track surface-side. Therefore, rotational torque can be reduced to a greater extent than when the external peripheral surface of the wave generator plug comes directly into sliding contact with the internal peripheral surface of the externally toothed gear 3.

Figure 3:
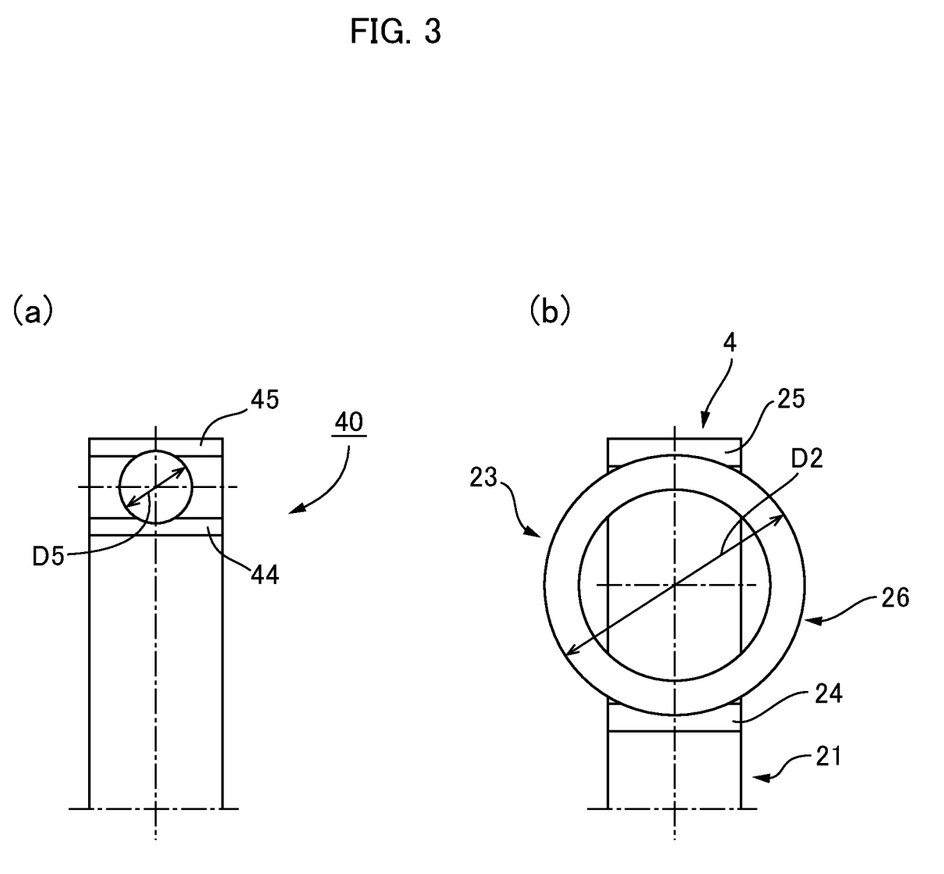
FIGS. 3(a) and 3(b) includes descriptive diagrams showing two examples of wave generators.

In this embodiment, the smaller the radius r1, or in other words, a larger coil diameter D2 in the case of a wave generator with the same diameter corresponds to a greater effect of reducing rotational torque. For example, in a rolling contact-type wave generator 40 provided with a commonly used ball bearing, the ball diameter D5 is smaller than the width dimension of the inner and outer races 44, 45, as shown in FIG. 3(a). In the sliding contact-type wave generator 4 of the present invention, however, the upper limit is limited by the track surface radius of the inner and outer races 24, 25, but it is possible to use the annular body 26, which is composed of an endless coil spring having a coil diameter D2 larger than the width of the inner and outer races, as shown in FIG. 3(b). It is thereby possible to make the radius r1 much smaller, and therefore to greatly reduce rotational torque.

With the wave generator 4 of the present invention, the ability of the outer race movement to follow the coning of the externally toothed gear 3 is improved. The outer race 25 of the wave generator bearing 23 is supported by the annular body 26 composed of an endless coil spring, and is therefore able to swing about the center of the annular body 26, following the coning shape of the externally toothed gear 3, as shown in FIG. 2(d). It is thereby possible to reduce rotational torque and to reduce uneven wear caused by one-sided contact.

Reference Test Example

Figure 4:
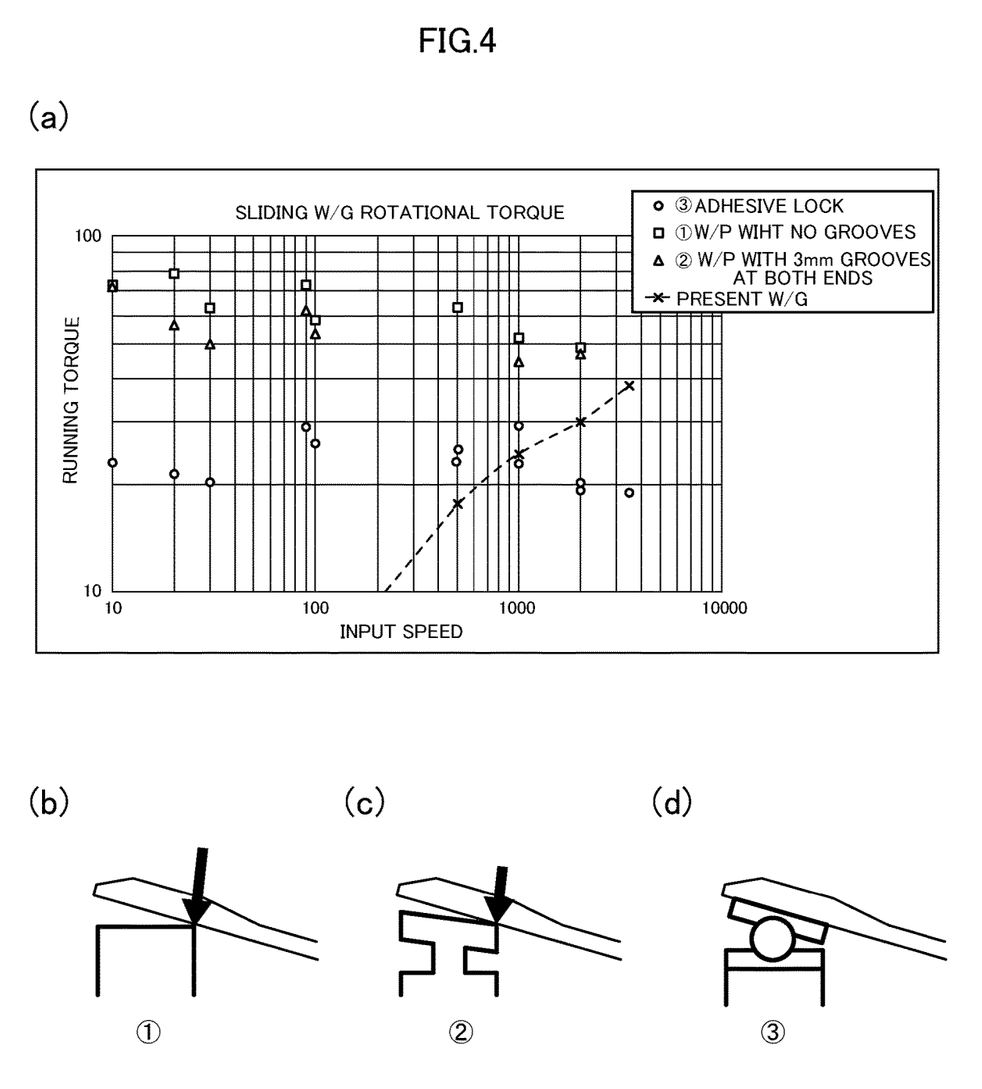
FIGS. 4(a), 4(b), 4(c) and 4(d) are a graph showing an example of test results showing the effects of coning on running torque in different forms of sliding contact-type wave generators.

FIG. 4(a) is a graph showing an example of test results showing the effect of coning on running torque in different forms of sliding contact-type wave generators. FIGS. 4(b), (c), and (d) are descriptive diagrams showing the sliding contact-type wave generators used in this test.

In the graph of FIG. 4(a), the dashed line connecting the points marked by "×" represents the change in running torque (rotational torque) relative to input speed when a common rolling contact-type (ball bearing-type) wave generator (W/G) is used in a cup-shaped strain wave gearing.

The points marked by squares are measurement results for when the ellipsoidal external peripheral surface of a plug (W/P) comes directly into sliding contact with the internal peripheral surface of the externally toothed gear, as shown in FIG. 4(b). The points marked by triangles are measurement results for when the ellipsoidal external peripheral surface of the plug comes directly into sliding contact with the internal peripheral surface of the externally toothed gear, and annular grooves are formed in both sides of the externally toothed gear to provide flexibility, as shown in FIG. 4(c). The points marked by circles are measurement results for when a rolling contact-type wave generator bearing (ball bearing) is locked so as to not roll by an adhesive, and made into a sliding contact-type bearing, as shown in FIG. 4(d).

As can be understood from the graph, running torque increases in accordance with input speed in the case of a rolling contact-type wave generator, but input speed has almost no effect in the case of a sliding contact-type wave generator.

The actual measured values of running torque are small (inverted frictional coefficient μ=0.10) in the case of the configuration (values marked by circle points in the graph) shown in FIG. 4(d), greater (inverted frictional coefficient μ=0.22) in the case of the grooved configuration (values marked by triangle points), and greatest (inverted frictional coefficient μ=0.26) in the case of the configuration (values marked by square points) shown in FIG. 4(b). From these results it is understood that running torque is affected by the ability or inability of the outer race movement to follow the coning shape of the externally toothed gear.

In the wave generator of the present invention, as with the configuration shown in FIG. 4(d), the outer race movement is able to follow the coning shape of the externally toothed gear (see FIG. 2(d)), and it is understood that increases in rotational torque caused by coning can therefore be better minimized than with the rolling contact-type wave generator shown in FIGS. 4(b) and (c).

Other Embodiments

Figure 5:
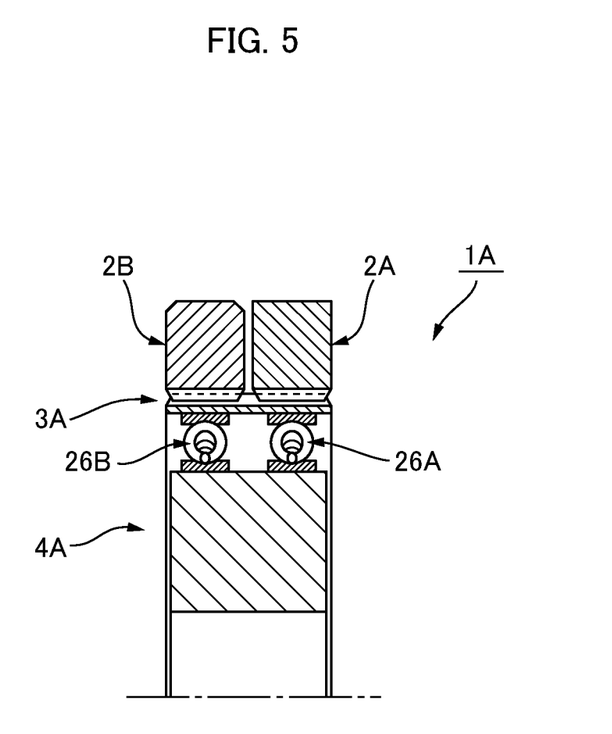
FIG. 5 is a descriptive diagram showing another example of a wave generator to which the present invention is applied.

The wave generator 4 described above is provided with one annular body, but it is also possible to use a plurality of annular bodies. For example, in a flat strain wave gearing 1A, a cylindrical, flexible externally toothed gear 3A is disposed on the inner sides of two rigid internally toothed gears 2A, 2B, and a wave generator 4A is disposed on the inner side of the externally toothed gear, as shown in FIG. 5. In the wave generator 4A, a first annular body 26A can be disposed in a position corresponding to the meshing center of the internally toothed gear 2A and the externally toothed gear 3A, and a second annular body 26B can be disposed in a position corresponding to the meshing center of the internally toothed gear 2B and the externally toothed gear 3A.

The wave generator bearing 23 of the wave generator 4 described above is provided with the inner race 24 and the outer race 25. The inner race 24 can be integrally formed in the ellipsoidal external peripheral surface 22 of the wave generator plug 21. Similarly, the outer race 25 can be integrally formed in the internal peripheral surface of the externally toothed gear 3.

Furthermore, in the example described above, the externally toothed gear is made to flex into an ellipsoidal shape using an ellipsoidally contoured wave generator, and is made to mesh with the internally toothed gear in two locations along the circumferential direction. It is also possible for the contour shape of the wave generator to be a three-lobe shape or another non-circular shape, and for the externally toothed gear to mesh with the internally toothed gear in three or more locations. Generally, the difference in the number of teeth between the externally toothed gear and the internally toothed gear is kn (n being a positive integer), where k (k being an integer of 2 or more) is the number of meshing locations.

The invention claimed is:

1. A wave generator of a strain wave gearing comprising:
   a rigid wave generator plug provided with a non-circular external peripheral surface; and
   a wave generator bearing fitted to the non-circular external peripheral surface and made to flex into a non-circular shape;
   wherein the wave generator bearing is provided with an inner race, an outer race, and an annular body fitted between the inner race and the outer race in a state of sliding contact; and
   the annular body is composed of an endless coil spring, the annular body having a rigidity capable of maintaining a fixed gap between the inner race and the outer race, and a flexibility in a radial direction of the annular body so as to be capable of flexing into a non-circular shape following the inner race;
   wherein an external peripheral surface of the inner race is provided with an inner race track surface having a recessed arcuate cross-section with which an external peripheral surface portion of the annular body comes into sliding contact, and
   an internal peripheral surface of the outer race is provided with an outer race track surface having a recessed arcuate cross-section with which an internal peripheral surface portion of the annular body comes into sliding contact.

2. The wave generator of the strain wave gearing according to claim 1,
   wherein the wave generator bearing is provided with a plurality of the annular bodies fitted between the inner race and the outer race.

3. A wave generator of a strain wave gearing comprising:
   a rigid wave generator plug provided with a non-circular external peripheral surface; and
   a wave generator bearing fitted to the non-circular external peripheral surface and made to flex into a non-circular shape;
   wherein the wave generator bearing is provided with an inner race, an outer race, and an annular body fitted between the inner race and the outer race in a state of sliding contact; and
   the annular body is composed of an endless coil spring, the annular body having a rigidity capable of maintaining a fixed gap between the inner race and the outer race, and a flexibility in a radial direction of the annular body so as to be capable of flexing into a non-circular shape following the inner race;
   wherein a coil winding diameter of the endless coil spring of the annular body is greater than widths of the outer race and the inner race.

4. A strain wave gearing comprising:
   the wave generator as set forth in claim 1.

5. The strain wave gearing according to claim 4, further comprising:
   a cup-shaped or top-hat-shaped externally toothed gear.

6. The wave generator of the strain wave gearing according to claim 3,
   wherein the wave generator bearing is provided with a plurality of the annular bodies fitted between the inner race and the outer race.

7. A strain wave gearing comprising:
   the wave generator as set forth in claim 3.

8. The strain wave gearing according to claim 7, further comprising:
   a cup-shaped or top-hat-shaped externally toothed gear.

* * * * *